Patented Feb. 9, 1932

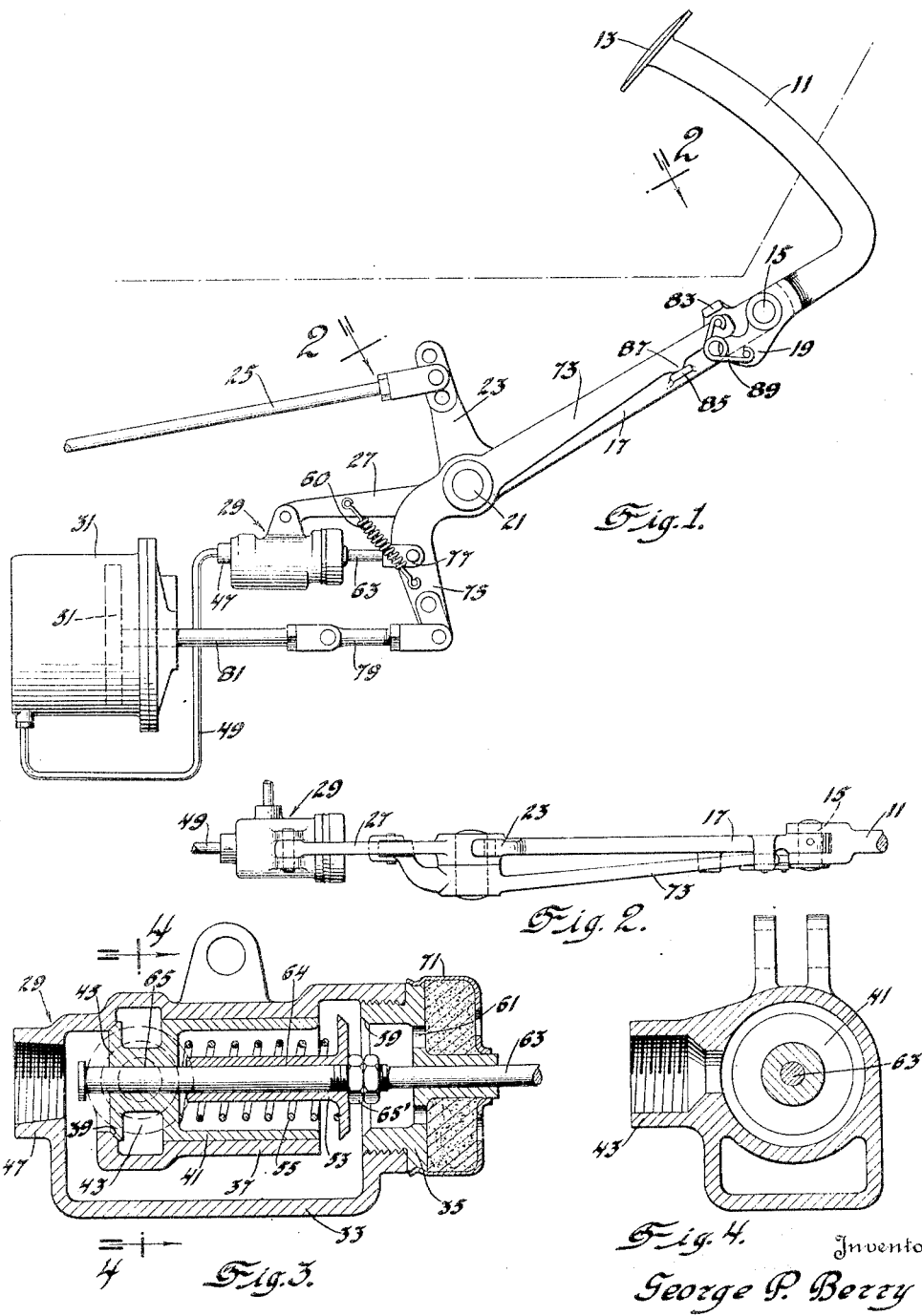

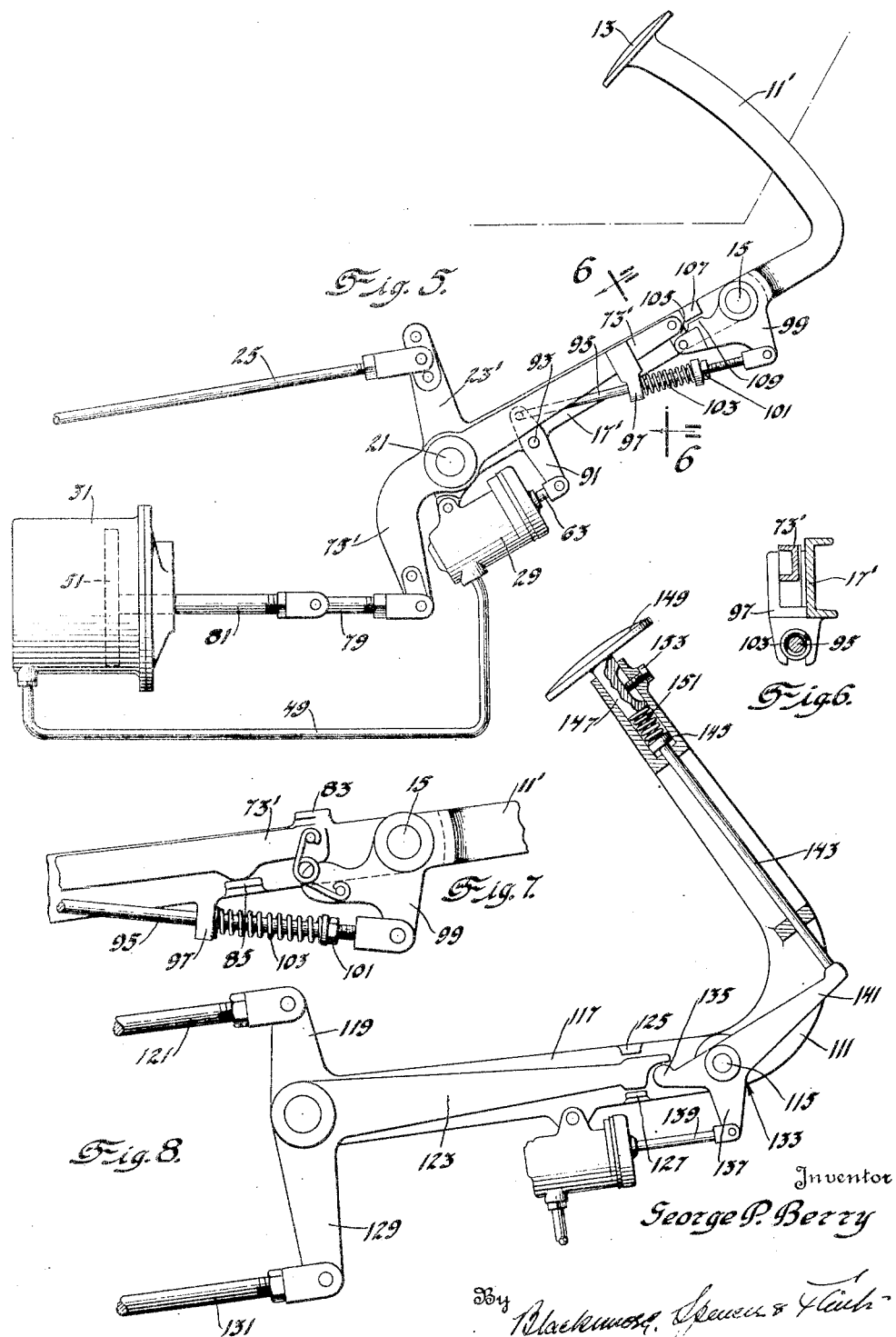

1,844,457

UNITED STATES PATENT OFFICE

GEORGE P. BERRY, OF DETROIT, MICHIGAN, ASSIGNOR TO GENERAL MOTORS RESEARCH CORPORATION, OF DETROIT, MICHIGAN, A CORPORATION OF DELAWARE

BRAKE

Application filed December 13, 1928. Serial No. 325,880.

This invention relates to brakes and has been designed as an improvement in vacuum servo brakes for use on vehicles.

An object of the invention is to provide an improvement in the operating mechanism for a vacuum servo brake.

As a more specific object the invention aims to provide combined mechanical and power brake operating mechanism employing a non-reactionary valve, and an arrangement whereby the operator always has the desired "feel", which measures for him the intensity of brake application. The invention also provides an arrangement whereby the brake automatically becomes purely mechanical in the event of failure of power actuating means.

Other objects and advantages will be obvious from the following description and the accompanying drawings, which latter shows certain embodiments which the inventive idea may assume.

In the drawings Figure 1 is a view in side elevation, showing the organization of parts. Figure 2 is a plan view on line 2—2 of Figure 1. Figure 3 is a longitudinal section through a simple non-reactionary valve which may be used. Figure 4 is a section on line 4—4 of Figure 3. Figure 5 is a view in elevation of a second form which the invention may take. Figure 6 is a section on line 6—6 of Figure 5. Figure 7 is a side view of a still further modification. Figure 8 shows also a side elevation of another form of the invention.

Referring by reference characters to the drawings and first to Figs. 1 to 4 inclusive, numeral 11 is a pedal provided with a pedal pad 13. The pedal is pivoted by pivot pin 15 to a brake lever 17. Preferably the pedal is forked at its pivot 15 as shown in Fig. 2, and one arm of the forked end is extended beyond the pivot as at 19, best shown in Fig. 1. The brake lever 17 is fulcrumed by a pivot pin 21 to any convenient part of the vehicle chassis. The lever 17 has adjacent its pivot 21 an upwardly directed arm 23 having connected thereto a link 25. This link is to be connected to any preferred or conventional brake hook-up. Any arrangement of brakes to check the rotation of the wheels may be employed. This invention is not concerned with the specific kind and location of brakes but relates only to the organization of parts by which the brakes are applied. Lever 17 also has an arm 27 which may be, as illustrated, located beneath the link 25. At the end of arm 27 is pivoted a valve designated by reference character 29. The function of this valve is to control the action of the brake operating cylinder 31.

The valve comprises a body portion 33 and a cover 35. The body is formed integrally with an internal cylindrical body 37 open at both ends within the inclosure defined by the body and cover. Slidably arranged within portion 37 is a suction valve member 41 having a recessed portion opposite an opening 43 through the wall of the cylinder 37 and valve body as shown in Fig. 4. This opening is to receive a flexible pipe which is to afford communication with a source of suction, preferably being connected to the manifold of the engine. This connection is common and well known in vacuum brakes and has not been illustrated. The suction valve member ends with a flange 45 to engage a flange around an opening 39 at the end of cylindrical portion 37. The cooperation of these parts 45 and 39 constitutes a valve whereby the suction of the manifold may at times be effective upon the portion of the valve body outside the cylinder 37 as will be obvious. At 47 is a threaded opening for connection with a flexible pipe 49, this pipe being also connected to a brake cylinder 31 on the active side of piston 51 movable therein.

In further explanation of the valve 29, there will be seen an air valve 53 slidable within suction valve 41. The remote ends of the valves are closed and between the valves there is housed a spring 55 acting to push the valves in opposite directions, valve 41 being actuated against its seat adjacent opening 39, and valve 53 forced outwardly through the opposite open end of cylinder 37. The closure 35 for valve body 33 is formed with an annular shoulder 59 against which valve member 53 may seat. The head 35 is provided with openings 61 admitting air freely to the region outside valve seat 59 as shown in the drawings. A rod 63 enters a central opening in head 35 and passes through aligned central openings 64 and 65 in the air valves and suction valves members. The rod 63 extends through opening 65 in the suction valve member, and the rod 63 has a head which may engage the end of valve 41 whereby a reciprocating movement of the rod to the right in Fig. 3 will open suction valve member against the tension of inclosed spring 55. Rod 63 is threaded for carrying a nut 65' through the instrumentality of which a movement of rod 63 to the left may at times lift the air valve member from its seat 59 and admit atmospheric air to that portion of the valve body 33 outside cylinder 37. For the purpose of opening the air valve member, there is provided a spring 60 which may be connected to arm 27 and to arm 75, the latter arm being a portion of a lever 73, the location and purpose of which will be explained below. This spring will in an obvious manner operate to push rod 63 inwardly and through the means of nut 65' lift the valve member 53 from its seat, the head at the opposite end of rod 63 moving freely as shown. Preferably a dust cap 71 will be used in the end of valve 29. It may be attached in any conventional way to cover member 35 and any preferred dust gathering substance 71' may be placed between the cover member 35 and the cap 71.

Pivoted on pivot 21 is a reaction lever 73. Lever 73 has an arm 75, this being the arm referred to above in connection with the attachment of spring 60. The arm 75 extends downwardly from its pivot and is connected by suitable connecting means 77 with rod 63 of the valve. At its extreme end arm 75 is connected by a link 79 with a rod 81 connected to piston 51. Lever 73 extends from its pivot 21 up along and substantially parallel with lever 17. It terminates short of the pivot 15 between the pedal 11 and the brake lever 17. Its end may at times engage an abutment 83 on brake lever 17. Another abutment 85 also on lever 17 may at times be engaged by projection 87 on the reaction lever 73. A spring 89 has its ends connected to arm 19 of the pedal and the extremity of lever 73 and tends to at all times hold these parts in contact.

The operation of the device is as follows: When the brake operating means is at rest and with no manual pressure applied to pedal 11, projection 87 on the reaction lever 73 is in engagement with abutment 85, this contact being effected by the action of spring 60. This spring 60 in rotating lever 73 into engagement with abutment 85, is also pushing rod 63 into the valve 29 and nut 65' is lifting air valve member 53 off its seat against the tension of inner spring 55. Under these circumstances the brake cylinder 31 and the valve body 33 are at atmospheric pressure, being in communication with the air through the open air valve member. In applying the brake the pedal is depressed as usual. It turns about pivot 15 and through its contact with the extreme end of reaction lever 73 breaks the contact between part 85 and 87, swings lever 73 counter clockwise and withdraws rod 63 from the valve 29 sufficiently to permit the air valve member 53 to seat at 59. This action is accompanied by another operation which should be noted at this point. The pressure upon pedal pad 13 tends to swing the pedal 11 clockwise about fulcrum 15. The action of spring 60 is tending to swing the pedal arm 19 counter clockwise about point 15. Keeping in mind that pivot 15 is mounted on the brake lever 17, it will be seen therefore that the two balancing forces acting on opposite sides of pivot 15 will tend to swing lever 17 in a clockwise direction about pivot 21 whereby arm 23 will exert a pull through link 25 to take up the clearance in the brakes. It should be understood that this action takes place prior to any actuation of the brake by the supplemental power means. A slight further movement of the pedal further rotates lever 73 counter-clockwise and opens the suction valve member 41 whereupon the suction of the manifold is effective through the opening 43, opening 39, the valve body outside the cylinder 37, the conduit 49, and the portion of the brake cylinder to the left of piston 51. Inasmuch as that portion of cylinder 31 to the right of piston 51 is open to the atmosphere, piston 51 is forced to the left and through the instrumentality of its rod 81 and connection 79, the reaction lever 73 is rotated clockwise. There results a force applied by lever 73 due to the power device and a force applied manually to the pedal which forces may be balanced and together rotate lever 17 about pivot 21 and apply the brake. When the power applied force exceeds manually applied force it swings lever 73 toward abutment 85. At an intermediate point in the swing of lever 73 the suction valve closes and the suction applied force may then be balanced by the foot pressure on the pedal to hold the brake applied. A further depression of the pedal will again open the suction valve member and a new balance will be obtained. When the foot is removed from the pedal and lever 73 swings to abutment 85 the air valve opens and the brake ceases to be applied. On the other hand, if the pedal pressure exceeds the power applied force acting through lever 73 it may swing lever 73 to abutment 83 and all such excess is effective to additionally apply the brake. In actual practice the manual pressure on the pedal will go along with the action of the power brake applying means. There will then be two forces acting on pivot 15 at the end of lever 17, one of these is the manual effort applied upon the pedal tending to turn the pedal clockwise and the other is the pressure acting from the power source through reaction lever 73 and operating upon arm 19 tending to rotate arm 19 counter-clockwise. These two forces, to whatever extent they balance, constitute a combined force swinging arm 17 and lever 23 clockwise to apply the brakes. If the power brake means predominates it will swing lever 73 toward its abutment 85 whereupon no additional power brake may be had. If the manual force on the pedal pad predominates, it may swing lever 73 against abutment 83. When in this position any desired degree of manual effort may be used to supplement the power brake. Also, should the power brake be ineffective, the manual effort is at once effective through the extremity of the pedal 19, the latter holding lever 73 against the abutment 83 of the lever 17.

It will be seen that the valve is not a reaction valve. By this statement it is meant to convey the idea that the valve does not react upon the pedal. In this way it is possible to simplify the valve construction. Through the instrumentality of the system of levers, however, the greater the power brake the greater manual effort required to effect the balance. In this way the feel on the pedal gives to the operator a measure of the intensity of brake application at all times.

In Fig. 5 is shown a modified form. In this figure the pedal 11' corresponds in general with the pedal in the previous form, pad 13 being used as before. The pedal is pivoted at 15 upon the end of a brake lever 17' corresponding in general to lever 17 of the other form. In order to produce a more effective lever arrangement for the actuation of the valve 29 a two-arm lever 91 is pivoted at 93 to the lever 17' adjacent its pivot 21. To the lower end of this lever 91 is connected the actuating rod 63 of the valve 29. To the upper end of the lever is connected a rod 95. This rod 95 passes through a guide opening and spring abutment member 97 carried by or secured to the said lever 17'. The end of rod 95 is connected to a pedal extension 99. Between the abutment 97 and an adjustable member 101 on rod 95 is a spring 103. At 73' is the equivalent of the reaction lever 73 of the form first described. Between the extreme end of this reaction lever and the end of pedal arm 99 is a link 105. This link takes the place of the abutment between the pedal arm 19 and the lever 73 of Fig. 1 and also avoids the use of spring 89. In this case also an abutment 107 on lever 17' engages an abutment 109 of the pedal arm. This engagement of 107 with 109 takes the place of the engagement of lever 73 with abutment 83 on the other form. The clockwise movement of lever 73' is limited by engagement with the bottom of the recess in member 97 as will be seen by examination of Fig. 6. The piston 51 in cylinder 31 is connected as before by means of a rod 81 and connecting means 79 with the extreme end 75' of the reaction lever 73'. Link 25 is connected as before to an arm 23' formed on lever 17'.

The operation of this modified form is substantially the same as that of the form already described. The spring 103 becomes slightly compressed in the first action of the pedal in permitting the air valve member to close. This compressed condition of spring 103 balances the manual effort applied to pedal pad 13, the two forces combining to swing lever 17' about its pivot 21 sufficiently to take up brake clearance. The unbalance caused by further movement of the pedal opens the suction valve. The power means then acting to swing reaction valve 73' may be resisted by a further pressure on the pedal pad to prevent lever 73' swinging down upon its abutment, which engagement with the abutment as explained above closes the suction valve and cuts off the power brake. As before, if the power brake fails, positive engagement of the parts permits the mechanical brake to act alone. One advantage of this construction is the use of the link, 105. This link, being comparatively noiseless, is perhaps to be preferred to the engagement of the parts as shown in Fig. 1. Another advantage consists in the use of lever 91 whereby greater movement of the actuating rod 63 is effected by a given movement of the pedal. It therefore follows that there is less lost motion in the pedal and the action of the brake is more nearly like that of the conventional brake pedal.

In Fig. 7 is shown a form wherein certain features of each of the above described elements are adopted. In this figure the pedal is the pedal 11' of Fig. 5. In place of the link 105 there is shown the abutment between the end of the pedal and the reaction lever. In this case the abutment at 83 in Fig. 1 has been adopted as has also the abutment at 85. In this case, also, there has been adopted the actuating means for the valve as shown in Fig. 5. The figure illustrates the rod 95 but it does not illustrate the complete organization. It will be understood that the rod 95 is connected to the valve 29 as in Fig. 5.

The operation of this modification will be understood from the above description and requires no further explanation.

In Fig. 8 there is illustrated a slightly different form which the invention may assume. In this form of the invention the pedal 111 is made integral with brake lever 117. Lever 117 has an arm 119 which through a link 121 may apply the brake. The reaction lever 123 has its end movable between abutments 125 and 127 on the lever 117. Lever 123 has an arm 129 which is to be connected by a rod 131 to the piston of the power cylinder 31 as in the other forms of the invention. Also carried on pivot 115 is a three-arm lever 133. One arm 135 of this lever 133 is in close contact with an extreme end of lever 123 as shown in the drawing. The second arm 137 of this lever is connected by a rod 139 to the rod 63 of the valve 29 as before. The other arm 141 of lever 133 is in engagement with rod 143 which is slidably engaged with the pedal as illustrated. The upper end of the pedal is recessed and within this recess is a disc 145 on the end of rod 143. Between this disc 145 and a stem 147 of the pedal pad 149 is a spring 151. The stem 147 is longitudinally recessed and its sliding movement is guided by a threaded member 153.

In this form of the invention the reaction member 123 operates as before between the two abutments 125 and 127. It rests against abutment 127 when in inactive position. In its active position it is moved toward abutment 125 in which latter position the suction valve assumes its maximum open position. Should the power means fail to operate, the manual pressure will be effective through lever 133 and the engagement of 123 with 125 to apply the brake by manual means solely. When the suction brake is operating, the action of the power means through lever 123 tending to swing lever 133 in one direction cooperates with the pedal pressure tending to swing lever 133 in the opposite direction so that lever 117 swings clockwise and applies the brake through link 121. It is believed that the operation will be fully understood when considered with the more complete statement in connection with the other forms.

I claim:

1. In operating mechanism for brakes, a brake lever, a first lever pivoted to said brake lever at a point removed from the brake lever fulcrum, said first lever having an arm on one side of its pivot to serve as a pedal and a second arm on the other side of its pivot, a reaction lever having a pivotal connection concentric with the brake lever and having an arm extended to a point adjacent the second arm of the first lever, means operably connecting said adjacent lever arms, power operated means and a connection therefrom connected solely to said reaction lever whereby the forces applied to said pedal and to said reaction lever, may cooperate to rotate said brake lever.

2. In brake operating means, a brake lever, a manually operable lever pivoted thereto, a reaction lever, power operated means, a connection therefrom connected solely to said reaction lever, means operably connecting said manually operable lever and said reaction lever whereby said levers may jointly and without relative rotation rotate said brake lever, or may rotate in opposite directions when one of the applied forces exceeds the other, and means on said brake lever adjacent said connecting means to limit said movements of opposite rotation.

3. In combination, a brake lever, a pedal pivoted thereto, a stop on said brake lever to limit the relative movement of said pedal and brake lever, a reaction lever, power means, a connection therefrom connected solely to said reaction lever, means operably connecting said reaction lever and pedal whereby the power means operable on said reaction lever may oppose the rotation of said pedal by the manually applied force and thereby jointly with the manually applied force rotate the brake lever.

4. The invention defined by claim 3, said power means comprising a fluid pressure brake cylinder, a valve controlling the action of said brake cylinder, said valve having movable parts for arrangement in active, neutral and exhaust positions, means controlled by the relative position of said brake lever and said other levers to determine the position of said valve parts.

5. In combination, a brake lever, a brake pedal pivoted adjacent one end of said brake lever, a power cylinder, a control valve therefor, a reaction lever, a connection between said power cylinder and said reaction lever, a connection between said reaction lever and said pedal, whereby the forces applied to said pedal and reaction lever may jointly rotate said brake lever, means controlled by relative position of said pedal and brake lever to operate said valve to render active, neutral, or inoperative the action of the control valve upon said power cylinder, said means comprising a lever pivoted to said brake lever, a link connected to said lever and said pedal, and a connection from said last named pivoted lever to said valve.

6. The invention defined by claim 5, together with a spring effective upon said link to normally render the valve inoperative.

7. In combination, brake lever, a pedal pivoted thereto, a reaction lever pivoted coaxially with said brake lever, means operably connecting adjacent ends of the pedal and reaction lever, power means operably active upon said reaction lever and through the connection between the reaction lever and pedal, to oppose the manual effort applied to the pedal and jointly rotate the brake lever.

8. The invention defined by claim 7, together with a plurality of stops on said brake lever to limit the rotation relative thereto of the pedal and reaction lever in both directions of rotation of said pedal and reaction lever.

9. In mechanism for operating brakes, a brake lever, a manually operable lever pivoted thereto, a reaction lever, power-operated means, a connection from said power-operated means to said reaction lever, said connection being independent of any connection with the brake lever and connected solely to the reaction lever and operable upon the brake lever only indirectly through the reaction lever, said reaction lever having a part associated with an arm of the manually operable lever whereby said power-operated means and the manual effort applied to the manually operable lever may jointly rotate the brake lever, and means to limit the movement of rotation of the manually operable lever relative to the brake lever.

10. In brake-operating means, a brake lever, a second lever pivoted thereto at a point removed from the brake lever pivot, said second lever having an arm adapted for the application of manually applied force, power-operated means including a reaction lever pivoted concentrically with the brake lever, said reaction lever and said second lever having arms operably associated for mutual reaction the one on the other, whereby the manually applied force and the power-applied force may jointly rotate the brake lever.

11. The invention defined by claim 10 together with a stop on said brake lever adjacent the path of movement of one of the other two levers to limit the movement of said manually operable lever relative to the brake lever, whereby an axcess of manually applied force over the power applied force may be effective to rotate the brake lever.

12. The invention defined by claim 10 together with a control means for said power-operated means, actuating means for said control means, said actuating means operated by relative movement of said brake lever and reaction lever, stops on said brake lever to limit the movement of the reaction lever relative to the brake lever.

In testimony whereof I affix my signature.

GEORGE P. BERRY.